United States Patent
Kinoshita et al.

(10) Patent No.: US 9,932,024 B2
(45) Date of Patent: Apr. 3, 2018

(54) VEHICLE BRAKE HYDRAULIC PRESSURE CONTROL APPARATUS

(71) Applicants: NISSIN KOGYO CO., LTD., Ueda-shi, Nagano (JP); HONDA MOTOR CO., LTD., Minato-ku, Tokyo (JP)

(72) Inventors: Takashi Kinoshita, Ueda (JP); Kohei Akamine, Wako (JP); Masaki Koike, Wako (JP)

(73) Assignees: AUTOLIV NISSIN BRAKE SYSTEMS JAPAN CO., LTD., Nagano (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/860,110

(22) Filed: Sep. 21, 2015

(65) Prior Publication Data
US 2016/0009265 A1    Jan. 14, 2016

Related U.S. Application Data

(63) Continuation of application No. PCT/JP2014/058217, filed on Mar. 25, 2014.

(30) Foreign Application Priority Data

Mar. 29, 2013    (JP) .................................. 2013-071328

(51) Int. Cl.
*B60T 13/66* (2006.01)
*B60T 8/40* (2006.01)
(Continued)

(52) U.S. Cl.
CPC ............ *B60T 13/662* (2013.01); *B60T 7/042* (2013.01); *B60T 8/245* (2013.01); *B60T 8/4081* (2013.01);
(Continued)

(58) Field of Classification Search
CPC .......... B60T 13/46; B60T 13/26; B60T 13/66; B60T 13/72; B60T 7/12; B60T 8/32; B60T 8/24
See application file for complete search history.

(56) References Cited

U.S. PATENT DOCUMENTS 4,852,950 A * 8/1989 Murakami .......... B60T 8/17616
180/197
5,984,429 A * 11/1999 Nell ........................ B60T 7/042
303/113.4
(Continued)

FOREIGN PATENT DOCUMENTS

EP          2014526        1/2009
JP       2001-39182 A      2/2001
(Continued)

OTHER PUBLICATIONS

International Search Report issued in PCT/JP2014/058217 dated Jun. 17, 2014.
(Continued)

*Primary Examiner* — Thomas J Williams
*Assistant Examiner* — James K Hsiao
(74) *Attorney, Agent, or Firm* — Hamre, Schumann, Mueller & Larson, P.C.

(57) ABSTRACT

A vehicle brake hydraulic pressure control apparatus (control apparatus 100), installed in a vehicle reducing a drive torque when the vehicle is at a halt, that includes vehicle holding control section 113 for performing vehicle holding control by holding a brake hydraulic pressure when the vehicle is at a halt. The vehicle holding control section 113 is configured to release the holding of the brake hydraulic pressure based on the accelerator operation of a driver when the vehicle is at a halt and, in the releasing of the holding of the brake hydraulic pressure, release the holding of the brake
(Continued)

hydraulic pressure completely before the drive torque of the vehicle starts increasing.

16 Claims, 8 Drawing Sheets

(51) Int. Cl.
    *B60T 7/04*         (2006.01)
    *B60T 13/14*       (2006.01)
    *B60T 13/68*       (2006.01)
    *B60T 13/74*       (2006.01)
    *B60T 8/24*        (2006.01)

(52) U.S. Cl.
    CPC .......... *B60T 13/146* (2013.01); *B60T 13/686* (2013.01); *B60T 13/745* (2013.01); *B60T 2201/06* (2013.01)

(56) References Cited

U.S. PATENT DOCUMENTS

| | | | |
|---|---|---|---|
| 6,068,576 A * | 5/2000 | Tsutsui | F16H 61/061 477/132 |
| 6,199,964 B1 * | 3/2001 | Ota | B60T 7/122 303/166 |
| 6,246,944 B1 * | 6/2001 | Maruyama | B60K 6/20 303/167 |
| 6,346,064 B1 | 2/2002 | Hada et al. | |
| 6,364,436 B1 * | 4/2002 | Sawada | B60T 7/042 188/353 |
| 6,945,610 B1 * | 9/2005 | Mizutani | B60T 8/3275 303/11 |
| 8,764,124 B2 * | 7/2014 | Furuyama | B60T 8/1766 303/146 |
| 9,045,119 B2 * | 6/2015 | Burkert | B60T 7/122 |
| 9,434,365 B2 * | 9/2016 | Kinoshita | B60T 7/122 |
| 2001/0038243 A1 * | 11/2001 | Isono | B60K 6/365 303/116.1 |
| 2003/0040862 A1 * | 2/2003 | Eckert | B60W 10/06 701/84 |
| 2003/0137192 A1 * | 7/2003 | Hano | B60T 7/122 303/192 |
| 2004/0183373 A1 * | 9/2004 | Yonemura | B60T 7/122 303/191 |
| 2006/0145533 A1 * | 7/2006 | Braeuer | B60T 7/122 303/191 |
| 2007/0050120 A1 * | 3/2007 | Tabata | B60K 6/44 701/80 |
| 2007/0182243 A1 * | 8/2007 | Osborn | B60T 7/22 303/10 |
| 2009/0021072 A1 * | 1/2009 | Kobayashi | B60T 8/17636 303/163 |
| 2010/0030445 A1 | 2/2010 | Ishikawa et al. | |
| 2010/0138123 A1 * | 6/2010 | Tokimasa | B60T 7/18 701/70 |
| 2011/0006591 A1 * | 1/2011 | Yoshii | B60T 7/12 303/4 |
| 2012/0109482 A1 * | 5/2012 | Yoshii | B60T 7/042 701/70 |
| 2013/0060409 A1 | 3/2013 | Matsushita et al. | |
| 2013/0241275 A1 * | 9/2013 | Miyazaki | B60T 8/4081 303/6.01 |

FOREIGN PATENT DOCUMENTS

| | | |
|---|---|---|
| JP | 2009-12655 A | 1/2009 |
| WO | 2011/145441 A1 | 11/2011 |
| WO | 2012043641 | 4/2012 |

OTHER PUBLICATIONS

Extended European Search Report for European Application No. 14773185.5, dated Jul. 12, 2016, 8 pages.

* cited by examiner

FIG.7
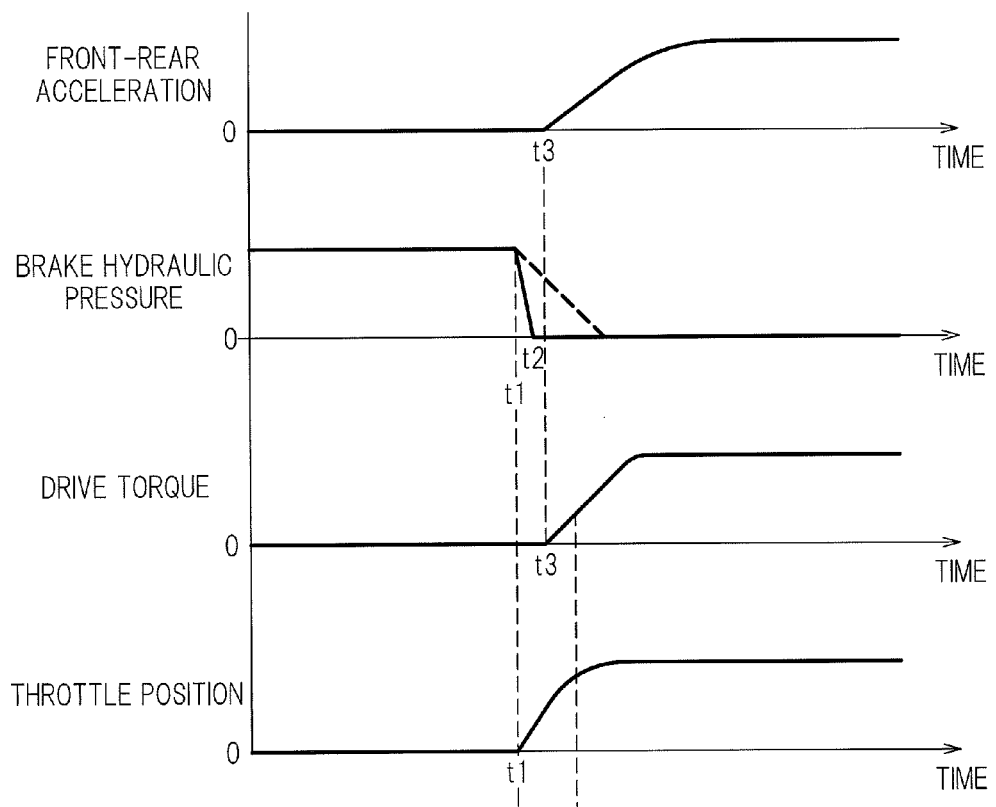
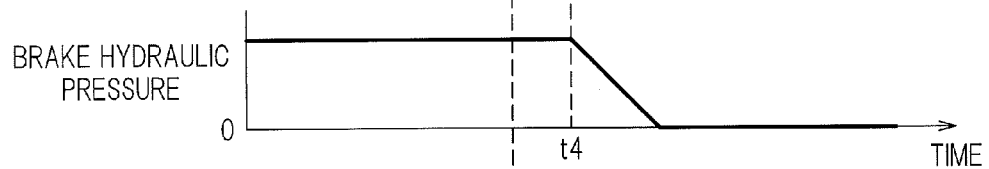
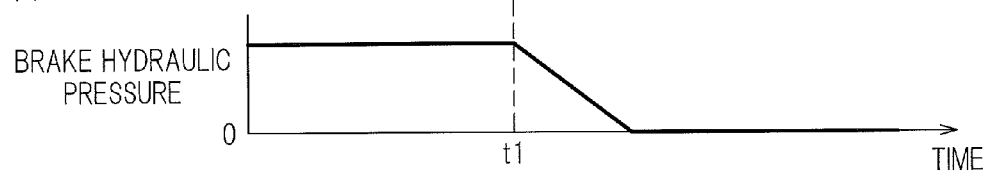

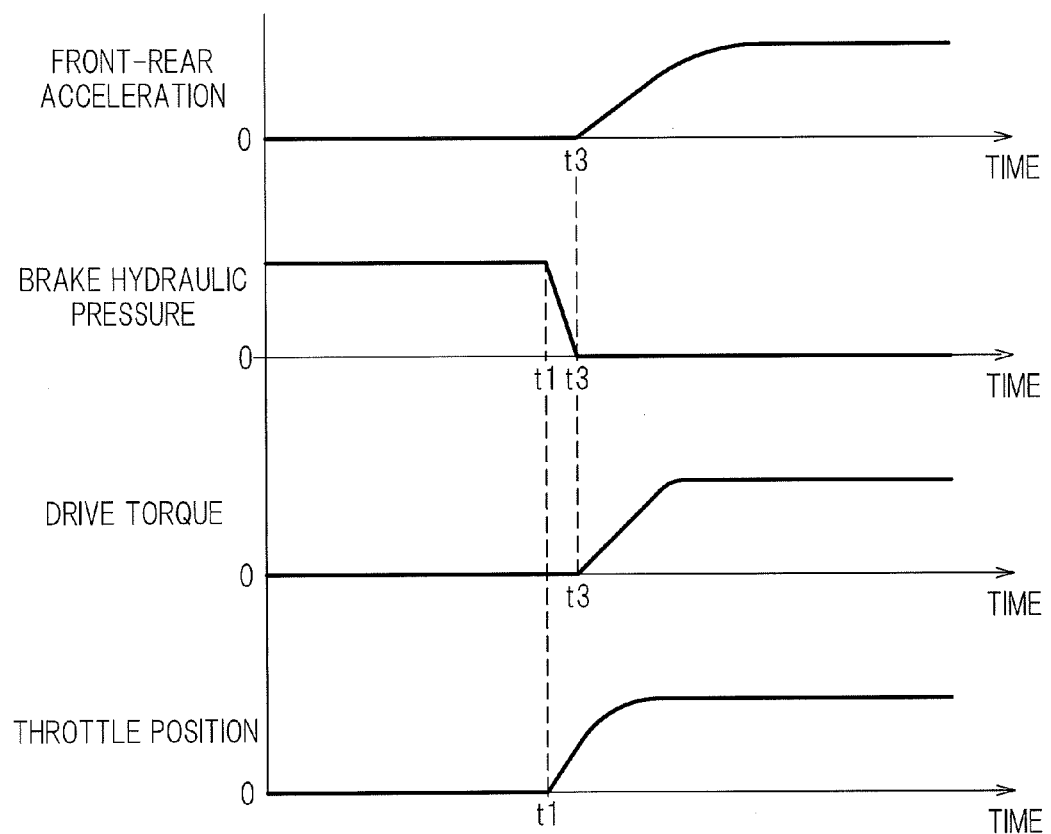

VEHICLE BRAKE HYDRAULIC PRESSURE CONTROL APPARATUS

TECHNICAL FIELD

The present invention relates to a vehicle brake hydraulic pressure control apparatus including vehicle holding control section for performing vehicle holding control by holding a brake hydraulic pressure when the vehicle is at a halt.

BACKGROUND ART

There is a known vehicle brake hydraulic pressure control apparatus including vehicle holding control section for holding a brake hydraulic pressure by reducing a drive torque (creep torque) when the vehicle is at a halt (Patent Literature 1). If the driver performs an accelerator operation when the vehicle is at a halt in such a control apparatus, vehicle holding control is released. That is, an accelerator operation triggers the reduction of the brake hydraulic pressure. In Patent Literature 1, the decompression is performed at the same time with an increase in the drive torque.

CITATION LIST

Patent Literature

Patent Literature 1: JP-A-2009-12655

SUMMARY OF INVENTION

Technical Problem

However, when the reduced drive torque is increased during decompression as in the technique in Patent Literature 1 (that is, when the drive torque is increased before decompression is completed), the difference between the drive torque and the braking force, which is a real drive torque, abruptly increases, as compared with a vehicle that does not reduce the drive torque during a halt. That is, simultaneous occurrence of an increase in the drive torque and reduction in the braking force causes a sudden feeling when the vehicle starts from a standstill. Accordingly, the conventional technique cannot achieve a natural acceleration feeling during a start from a standstill. Such artificiality during a start from a standstill is pronounced particularly on a flat road.

An object of the invention is to achieve a natural start from a standstill when the holding of a brake hydraulic pressure is released in a vehicle brake hydraulic pressure control apparatus including vehicle holding control section.

Solution to Problem

The present invention that solves the above problem is a vehicle brake hydraulic pressure control apparatus installed in a vehicle reducing a drive torque during a halt, the apparatus including vehicle holding control section for performing vehicle holding control by holding a brake hydraulic pressure when the vehicle is at a halt, in which the vehicle holding control section is configured to release the holding of the brake hydraulic pressure based on an accelerator operation of a driver when the vehicle is at a halt and, in the releasing of the holding of the brake hydraulic pressure, release the holding of the brake hydraulic pressure completely before a drive torque of the vehicle starts increasing.

In such a structure, since the holding of the brake hydraulic pressure is completely released when the drive torque of a vehicle starts increasing, the drive torque of the vehicle acts on the vehicle as a start force as is and there are no effects of changes in the braking force, thereby achieving a natural start from a standstill.

The above apparatus further includes gradient acquiring section for acquiring a road surface gradient, in which, only when the absolute value of the road surface gradient acquired by the gradient acquiring section is less than a predetermined value, in the releasing of the holding of the brake hydraulic pressure, the vehicle holding control section preferably releases the holding of the brake hydraulic pressure completely before the drive torque of the vehicle starts increasing.

In such a structure, on a substantially flat road having the absolute value of the road surface gradient less than a predetermined value, a smooth start from a standstill is enabled as the drive torque starts increasing, thereby obtaining a good feeling of a start from a standstill. In addition, it is possible to make control while preventing the vehicle from sliding down the inclined road surface.

In the above apparatus, the decompression gradient in the releasing of the holding of the brake hydraulic pressure in the vehicle holding control when the absolute value of the road surface gradient is less than the predetermined value can be larger than the decompression gradient when the absolute value of the road surface gradient is equal to or larger than the predetermined value.

In such a structure, it is easy to immediately complete decompression until the drive torque rises in order to increase the decompression gradient in a substantially flat road.

The above apparatus can be configured to completely release the holding of the brake hydraulic pressure before the drive torque of the vehicle starts increasing in the releasing of the holding of the brake hydraulic pressure in the vehicle holding control. In this case, it is possible to achieve a natural start from a standstill substantially reliably even in a vehicle in which it is difficult to determine a rise timing of the drive torque of the vehicle.

Alternatively, the above apparatus may be configured to completely release the holding of the brake hydraulic pressure as soon as the drive torque of the vehicle starts increasing in the releasing of the holding of the brake hydraulic pressure in the vehicle holding control. In this case, it is possible to achieve a natural start from a standstill while preventing the vehicle from sliding down substantially reliably.

BRIEF DESCRIPTION OF DRAWINGS

FIG. 7 (a) is a timing chart showing changes in the front-rear acceleration, brake hydraulic pressure, drive torque, and throttle position when vehicle holding control is released on a flat road, (b) of FIG. 7 is a timing chart showing changes in the brake hydraulic pressure on an ascending slope, and (c) of FIG. 7 is a timing chart showing changes in the brake hydraulic pressure on a descending slope.

FIG. 8 is a timing chart showing changes in the front-rear acceleration, brake hydraulic pressure, drive torque, and throttle position when vehicle holding control is released in a modification.

DESCRIPTION OF EMBODIMENTS

Next, an embodiment of the present invention will be described with reference to the drawings as appropriate.

Figure 1:
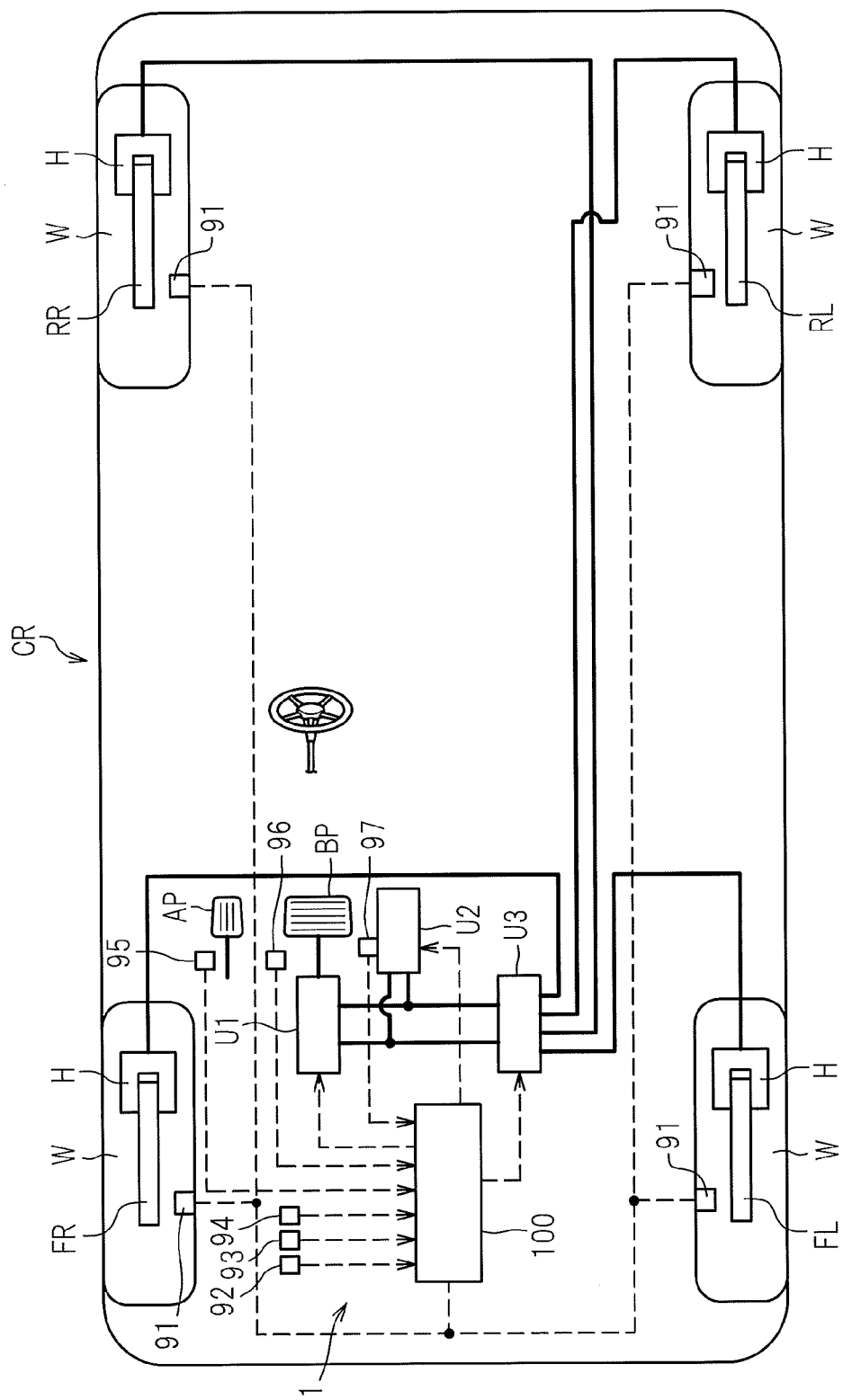
FIG. 1 is a structural diagram showing a vehicle including a control apparatus as an example of a vehicle brake hydraulic pressure control apparatus according to an embodiment of the present invention.

A brake system 1 shown in FIG. 1 to which a control apparatus 100 as a vehicle brake hydraulic pressure control apparatus according to the invention has been applied is configured to include a by-wire type electric brake system (for normal use) that operates the brake by transferring an electric signal and a conventional hydraulic brake system (for fail-safe use) that operates the brake by transferring a hydraulic pressure as is generated by depressing a brake pedal BP.

Accordingly, the brake system 1 is configured to include an input apparatus U1 to which an operation input by the driver via the brake pedal BP, a motor cylinder apparatus U2 that generates a brake hydraulic pressure according to the amount of operation of the brake pedal BP or according to necessary control, and a hydraulic pressure control unit U3 that performs brake hydraulic pressure control for assisting stabilization of vehicle behavior. The input apparatus U1, the motor cylinder apparatus U2, and the hydraulic pressure control unit U3 are configured by two systems: a first system that controls a front-right wheel brake FR and a rear-left wheel brake RL and a second system that controls a front-left wheel brake FL and a rear-right wheel brake RR. For each system, an independent connection is made by a hydraulic pressure line formed by a pipe such as, for example, a hose or the tube hose. In addition, the input apparatus U1 and the motor cylinder apparatus U2 are electrically interconnected by a harness (not shown).

The brake system 1 can be installed in various types of vehicles such as, for example, a vehicle driven only by an engine (internal combustion), a hybrid vehicle, an electric vehicle, and a fuel cell vehicle.

To control vehicle behavior using an electric brake system and the hydraulic pressure control unit U3, the brake system 1 includes a wheel speed sensor 91, a steering angle sensor 92, a lateral acceleration sensor 93, a front-rear acceleration sensor 94, an accelerator pedal stroke sensor 95 for detecting the stroke of an accelerator pedal AP, a brake pedal stroke sensor 96 for detecting the stroke of the brake pedal BP, and a motor rotation angle sensor 97 in appropriate positions of the vehicle CR, and the output values of these sensors are output to the control apparatus 100. The motor rotation angle sensor 97 is a sensor that detects the rotation angle of an electric motor 42 (see FIG. 2) driving the motor cylinder apparatus U2.

The control apparatus 100 includes, for example, a CPU, a RAM, a ROM, and an input-output circuit, performs computation processes based on data or programs stored in the ROM, and controls the input apparatus U1, the motor cylinder apparatus U2, and the hydraulic pressure control unit U3. This enables the control apparatus 100 to provide appropriate braking forces for wheels W by controlling the brake hydraulic pressures applied to wheel cylinders H of the wheel brakes FR, RL, FL, and RR.

Figure 2:
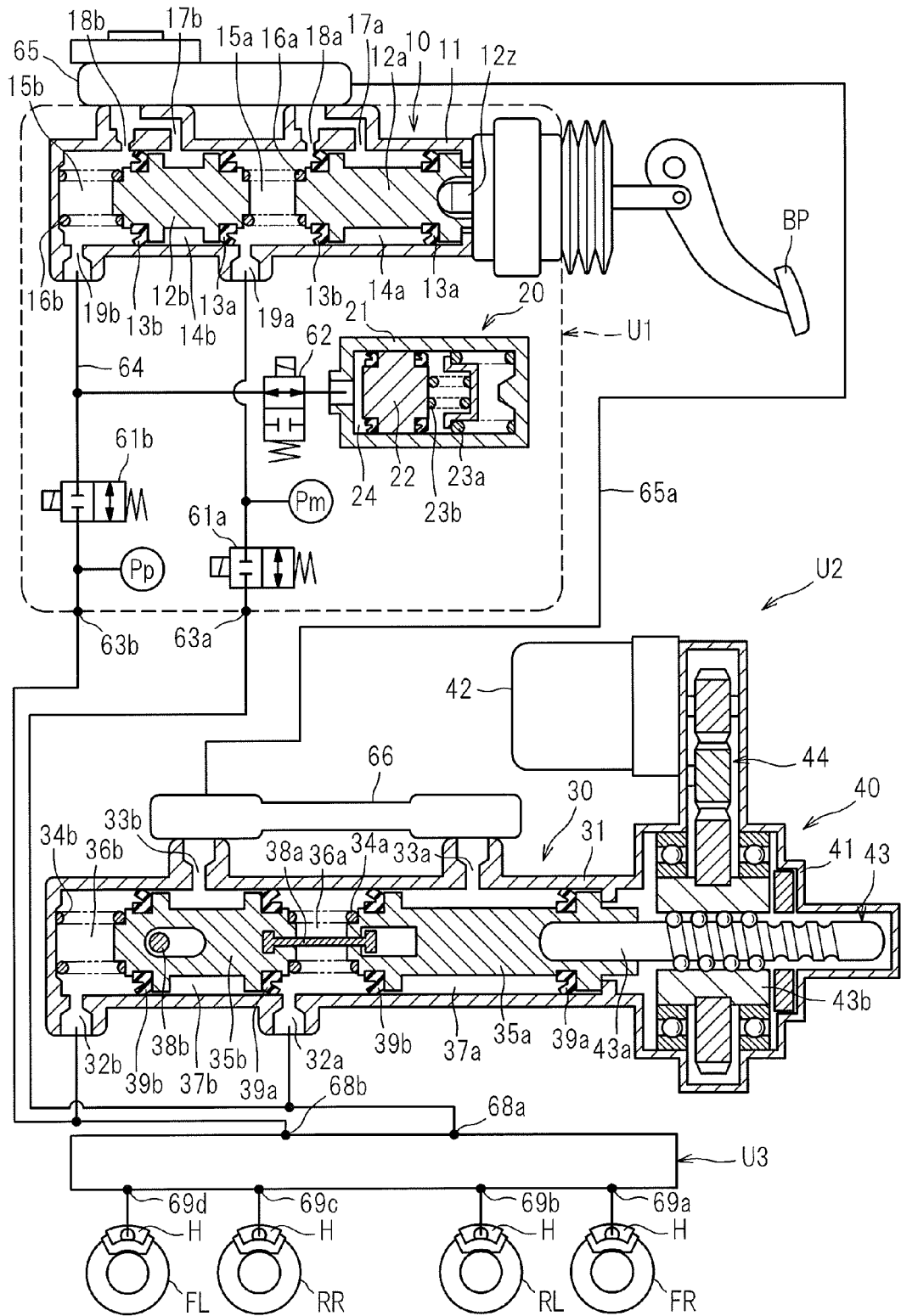
FIG. 2 is a structural diagram showing the brake hydraulic pressure circuits of an input apparatus and a motor cylinder apparatus.

As shown in FIG. 2, a connection port 63a of the first system of the input apparatus U1 is connected to an output port 32a of the motor cylinder apparatus U2 and an input port 68a of the hydraulic pressure control unit U3 via pipes. Similarly, a connection port 63b of the second system is connected to an output port 32b of the motor cylinder apparatus U2 and an input port 68b of the hydraulic pressure control unit U3 via pipes.

The hydraulic pressure control unit U3 is provided with four output ports 69a to 69d and the wheel cylinders H of the wheel brakes FR, RL, FL, and RR are connected to the ports 69a to 69d, respectively.

[Input Apparatus U1]

The input apparatus U1 includes a tandem type master cylinder 10 that can generate a hydraulic pressure according to an operation of the brake pedal BP by the driver, and a first reservoir 65 attached to the master cylinder 10. In a cylinder tube 11 of the master cylinder 10, a first piston 12a and a second piston 12b are slidably disposed at a predetermined distance from each other in the axial direction of the cylinder tube 11. The first piston 12a is disposed close to the brake pedal BP and is coupled to the brake pedal BP via a push rod 12z. The second piston 12b is disposed in a position more distant from the brake pedal BP than the first piston 12a.

On each of the outer periphery surfaces of the first piston 12a and the second piston 12b, a pair of piston gaskets 13a and 13b are attached at a distance from each other in the axial direction. The section of first piston 12a between the pair of piston gaskets 13a and 13b and the section of the second piston 12b between the pair of piston gaskets 13a and 13b have smaller diameters to form back chambers 14a and 14b, respectively. The back chambers 14a and 14b are connected to the first reservoir 65 via supply ports 17a and 17b, respectively.

A first pressure chamber 15a is formed between the first piston 12a and the second piston 12b and the first pressure chamber 15a is connected to the first reservoir 65 via a relief port 18a. Similarly, a second pressure chamber 15b is formed between the second piston 12b and a side end portion of the cylinder tube 11 and the second pressure chamber 15b is connected to the first reservoir 65 via a relief port 18b. The first pressure chamber 15a and the second pressure chamber 15b each generate a brake hydraulic pressure corresponding to the force applied to the brake pedal BP when the driver depresses the brake pedal BP.

A spring 16a is provided between the first piston 12a and the second piston 12b and a spring 16b is provided between the second piston 12b and a side end portion of the cylinder tube 11. Accordingly, when the driver stops operating the brake pedal BP, the first pressure chamber 15a and the second pressure chamber 15b are returned to have appropriate volumes.

In addition, output ports 19a and 19b that correspond to and communicate with the first pressure chamber 15a and the second pressure chamber 15b are formed, respectively, on the cylinder tube 11, and the output ports 19a and 19b are connected to the connection ports 63a and 63b of the input apparatus U1 via pipes.

On a pipe interconnecting an output port 19a of the master cylinder 10 and the connection port 63a of the input apparatus U1, a normally open solenoid valve 61a is provided. On a pipe connecting an output port 19b of the master cylinder 10 and the connection port 63b of the input apparatus U1, a normally open solenoid valve 61b is provided.

A stroke simulator 20 is connected, via a normally closed solenoid valve 62, to a pipe (branch hydraulic pressure line 64) connecting the output port 19b of the master cylinder 10 and the normally open solenoid valve 61b.

The normally open solenoid valves 61a and 61b in FIG. 2 are in a normal operation state (closed state) in which the solenoid valves are energized. The normally closed solenoid valve 62 in FIG. 2 is also in a normal operation state (open state) in which the solenoid valve is energized.

The stroke simulator 20 generates the stroke of a brake and its reaction force during by-wire control and makes the driver feel as if a braking force were generated by a depression force. A piston 22 is provided in a cylinder 21 and a hydraulic pressure chamber 24 communicating with the branch hydraulic pressure line 64 via the normally closed solenoid valve 62 is formed on one side of the piston 22. The hydraulic pressure chamber 24 can absorb a brake fluid derived from the second pressure chamber 15b of the master cylinder 10.

A first return spring 23a having a high spring constant and a second return spring 23b having a low spring constant are provided in series between the piston 22 and the side end portion of the cylinder 21, so that the increase gradient of a pedal reaction force is low in an initial stage of depression of the brake pedal BP and the increase gradient of a pedal reaction force is high in a late stage of depression. Accordingly, the pedal feeling of the brake pedal BP is similar to that of existing master cylinders.

A first hydraulic pressure sensor Pm is provided in the hydraulic pressure line connecting the output port 19a of the master cylinder 10 to the normally open solenoid valve 61 a and a second hydraulic pressure sensor Pp is provided in the hydraulic pressure line connecting the normally open solenoid valve 61b to the connection port 63b. The first hydraulic pressure sensor Pm measures the hydraulic pressure of the normally open solenoid valve 61 a close to the master cylinder 10, which is closed during normal operation. The second hydraulic pressure sensor Pp measures the hydraulic pressure of the normally open solenoid valve 61b close to the connection port 63b (close to the hydraulic pressure control unit U3), which is closed during normal operation. The output values of these sensors are output to the control apparatus 100.

[Motor Cylinder Apparatus U2]

The motor cylinder apparatus U2 includes an actuator mechanism 40 having the electric motor 42 and a cylinder mechanism 30 operated by the actuator mechanism 40.

The actuator mechanism 40 has an actuator housing 41 and the actuator housing 41 houses a ball screw mechanism 43 including a screw shaft 43a and a nut 43b and a reduction gear train 44 transferring the rotation of the electric motor 42 to the nut 43b. The screw shaft 43a is linked to a first slave piston 35a, which will be described later.

The cylinder mechanism 30 includes a cylinder body 31 and a second reservoir 66 attached to the cylinder body 31. The second reservoir 66 is connected to the first reservoir 65 via a pipe 65a. In the cylinder body 31, the first slave piston 35a and a second slave piston 35b are disposed slidably at a predetermined distance from each other in the axial direction of the cylinder body 31. The first slave piston 35a is disposed close to the ball screw mechanism 43 so as to abut against one end of the screw shaft 43a and be displaceable in a longitudinal direction of the cylinder body 31 integrally with the screw shaft 43a. The second slave piston 35b is disposed in a position more distant from the ball screw mechanism 43 than the first slave piston 35a.

On each of the outer periphery surfaces of the first slave piston 35a and the second slave piston 35b, a pair of slave piston gaskets 39a and 39b are attached in a distance from each other in the axial direction. The section of first slave piston 35a between the pair of slave piston gaskets 39a and 39b and the section of the second slave piston 35b between the pair of slave piston gaskets 39a and 39b have smaller diameters to form a first back chamber 37a and a second back chamber 37b, respectively. The first back chamber 37a and the second back chamber 37b are connected to the second reservoir 66 via reservoir ports 33a and 33b, respectively.

A first hydraulic pressure chamber 36a is formed between the first slave piston 35a and the second slave piston 35b and a second hydraulic pressure chamber 36b is formed between the second slave piston 35b and a side end portion of the cylinder body 31. The output ports 32a and 32b that correspond to and communicate with the first hydraulic pressure chamber 36a and the second hydraulic pressure chamber 36b are formed, respectively, on the cylinder body 31. The output ports 32a and 32b are connected to the connection ports 63a and 63b of the input apparatus U1 and the input ports 68a and 68b of the hydraulic pressure control unit U3, respectively. The first hydraulic pressure chamber 36a and the second hydraulic pressure chamber 36b generate a brake hydraulic pressure when the screw shaft 43a moves toward the first slave piston 35a by the operation of the electric motor 42, and the generated hydraulic pressure is supplied to the hydraulic pressure control unit U3 via the output ports 32a and 32b.

A spring 34a is provided between the first slave piston 35a and the second slave piston 35b and a spring 34b is provided between the second slave piston 35b and a side end portion of the cylinder body 31. Accordingly, when the screw shaft 43a moves away from the first slave piston 35a by the operation of the electric motor 42, the first hydraulic pressure chamber 36a and the second hydraulic pressure chamber 36b are returned to have appropriate volumes.

A restriction link 38a for restricting the maximum stroke (maximum displacement distance) and the minimum stroke (minimum displacement distance) between the first slave piston 35a and the second slave piston 35b is provided between the first slave piston 35a and the second slave piston 35b. A stopper pin 38b for restricting the sliding range of the second slave piston 35b and preventing over-returning toward the first slave piston 35a is provided in the second slave piston 35b.

[Hydraulic Pressure Control Unit U3]

Figure 3:
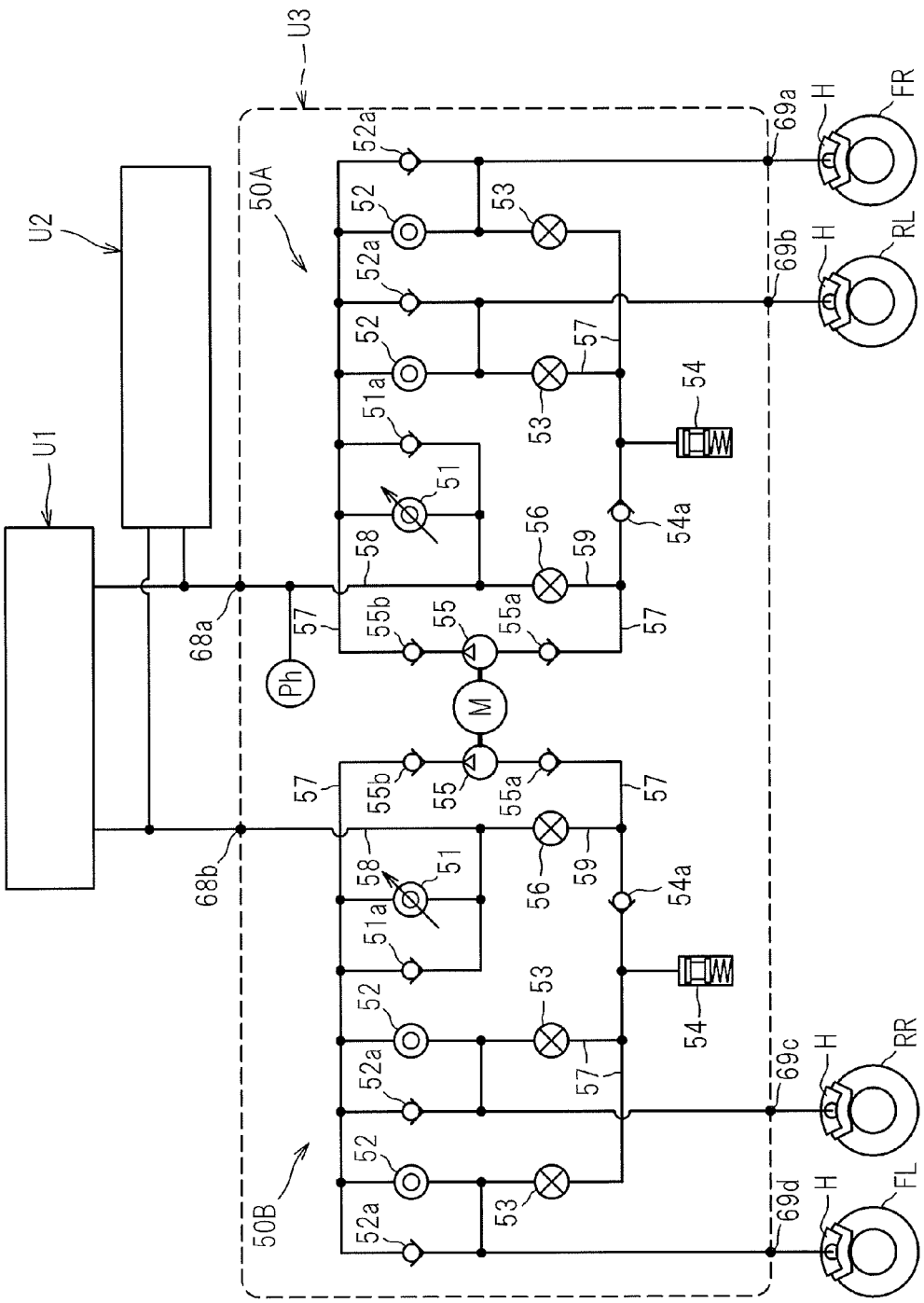
FIG. 3 is a structural diagram showing the brake hydraulic pressure circuit of a hydraulic pressure control unit.

As shown in FIG. 3, the hydraulic pressure control unit U3 is a well-known hydraulic pressure control unit and includes a first hydraulic pressure system 50A that controls the wheel brakes FR and RL and a second hydraulic pressure system 50B that controls the wheel brakes FL and RR. Since the first hydraulic pressure system 50A and the second hydraulic pressure system 50B have a similar structure, only the first hydraulic pressure system 50A will be described here and the second hydraulic pressure system 50B will not be described.

The first hydraulic pressure system 50A has a pressure regulator 51, which is a normally open proportional solenoid valve that can adjust the difference between the upstream and downstream hydraulic pressures depending on a current to be supplied, in a hydraulic pressure line connecting the input port 68a and the output ports 69a and 69b. A check valve 51 a that allows only a flow toward the output ports 69a and 69b is provided in parallel with the pressure regulator 51.

The hydraulic pressure line closer to the wheel brakes RL and FR than the pressure regulator 51 is branched midway and connected to the output port 69a and the output port 69b. An inlet valve 52, which is a normally open proportional solenoid valve, is provided in each of the positions on the hydraulic pressure line corresponding to the output ports 69a and 69b. A check valve 52a that allows only a flow toward the pressure regulator 51 is provided in parallel with each of the inlet valves 52.

From the hydraulic pressure line between the output port 69a and its corresponding inlet valve 52 and the hydraulic pressure line between the output port 69b and its corresponding inlet valve 52, a recirculation hydraulic pressure line 57 extends between the pressure regulator 51 and the inlet valve 52 via an outlet valve 53 including a normally closed solenoid valve.

On the recirculation hydraulic pressure line 57, a reservoir 54 that temporality absorbs an excess brake fluid, a check valve 54a, a check valve 55a, a pump 55, and a check valve 55b are arranged sequentially from the outlet valve 53 side. The check valves 54a, 55a, and 55b are disposed so as to allow only flows toward the line between the pressure regulator 51 and the inlet valve 52. In addition, the pump 55 is driven by a motor M and provided to generate a pressure toward the line between the pressure regulator 51 and the inlet valve 52.

An introduction hydraulic pressure line 58 interconnecting the input port 68a and the pressure regulator 51 is connected to the section between the check valve 54a and the check valve 55a in the recirculation hydraulic pressure line 57 by a suction hydraulic pressure line 59 via a suction valve 56, which is a normally closed solenoid valve.

In the introduction hydraulic pressure line 58, a third hydraulic pressure sensor Ph is provided only in the first hydraulic pressure system 50A. The output value of the third hydraulic pressure sensor Ph is output to the control apparatus 100.

In the hydraulic pressure control unit U3 having the above structure, the solenoid valves are not energized normally and a brake hydraulic pressure introduced from the input port 68a passes through the pressure regulator 51 and the inlet valve 52, is output to the output ports 69a and 69b, and is given to the wheel cylinders H as is. Then, when the excess brake hydraulic pressure of the wheel cylinders H is reduced to perform anti-locking braking control, the corresponding inlet valve 52 is closed and the corresponding outlet valve 53 is opened to pass the brake fluid to the reservoir 54 through the recirculation hydraulic pressure line 57, thereby draining the brake fluid in the wheel cylinders H. When the wheel cylinders H are pressurized in the case where the driver does not operate the brake pedal BP, the suction valve 56 is opened and then the motor M is driven, so that brake fluid can be actively supplied to the wheel cylinders H by the pressurization force of the pump 55. In addition, the degree of pressurization of the wheel cylinders H can be adjusted by feeding an appropriate current through the pressure regulator 51.

[Control Apparatus 100]

Next, the control apparatus 100 will be described in detail.

Figure 4:
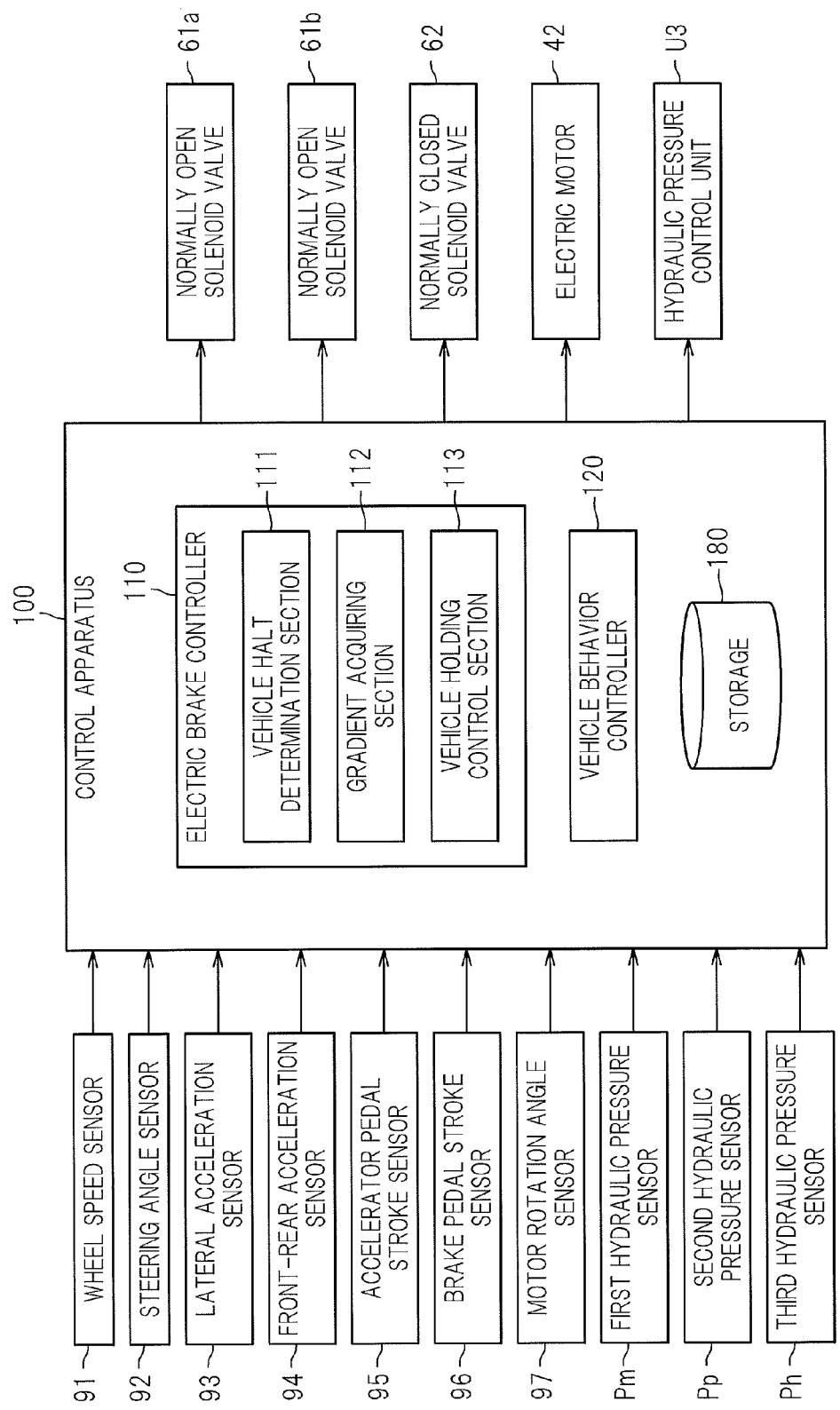
FIG. 4 is a block diagram showing the structure of the control apparatus.

As shown in FIG. 4, the control apparatus 100 includes an electric brake controller 110 that performs known by-wire brake control based on signals input from sensors, a vehicle behavior controller 120 that performs control such as anti-locking braking control and vehicle behavior stabilization control, and a storage 180 that stores various constants, maps, measurement values, calculation results, and the like, as appropriate. Although not described in detail, the control apparatus 100 is configured to reduce the drive torque by performing the idle stop of the engine or stopping the power of the motor when the vehicle CR is at a halt.

The vehicle behavior controller 120 has a conventionally known structure and is configured to control the behavior of the vehicle CR by controlling the brake hydraulic pressure applied to the wheel cylinders H of the wheel brakes FR, RL, FL, and RR by controlling the valves and the motor M of hydraulic pressure control unit U3.

The electric brake controller 110 separates the hydraulic pressure of the master cylinder 10 generated by depressing the brake pedal BP from the wheel cylinders H of the wheel brakes FR, RL, FL, and RR by passing a current through the normally open solenoid valves 61a and 61b normally to reach a closed state, and passes a current through the normally closed solenoid valve 62 to reach an open state, thereby enabling the operation of the stroke simulator 20. Then, the electric brake controller 110 generates the brake hydraulic pressure intended by the driver by rotating the electric motor 42 based on the amount of operation of the brake pedal BP detected by the brake pedal stroke sensor 96 and the hydraulic pressures detected by the second hydraulic pressure sensor Pp and the third hydraulic pressure sensor Ph.

In addition, the electric brake controller 110 includes vehicle halt determination section (vehicle holding control means) 111, gradient acquiring section (gradient acquiring means) 112, and vehicle holding control section (vehicle holding control means) 113 to achieve vehicle holding control that holds the halt state of the vehicle CR by holding the brake hydraulic pressure applied to the wheels W during a halt.

The vehicle halt determination section 111 has a known halt determination function and, when determining that the vehicle CR has halted, outputs a halt signal indicating the fact to the vehicle holding control section 113. The halt determination may be performed by, for example, determining whether the vehicle body speed calculated based on a signal from the wheel speed sensor 91 is equal to or less than a predetermined value.

The gradient acquiring section 112 acquires a road surface gradient from the front-rear acceleration sensor 94 and outputs the acquired road surface gradient to the vehicle holding control section 113. The gradient acquiring section 112 may be configured to apply a filter for suppressing a change in a front-rear acceleration value before the value is output in order to prevent an abrupt change in the front-rear acceleration value from being reflected to the road surface gradient. In the present embodiment, it is assumed that the road surface gradient of an ascending slope is positive and the road surface gradient of a descending slope is negative.

The vehicle holding control section 113 has a function of performing vehicle holding control that holds the actual brake hydraulic pressure applied to the wheels W during a halt. Specifically, when receiving a signal indicating halt determination from the vehicle halt determination section 111, the vehicle holding control section 113 stops the electric motor 42 and holds the brake hydraulic pressure at that time. When receiving a signal indicating depression of the accelerator pedal AP from the accelerator pedal stroke sensor 95, the vehicle holding control section 113 drives the electric motor 42, retracts the screw shaft 43a of the ball screw mechanism 43, and reduces the brake hydraulic pressure to release vehicle holding control.

During the decompression, when the absolute value of the road surface gradient acquired by the gradient acquiring section 112 is less than a predetermined value a (that is, when the vehicle CR is placed on a substantially flat road having a road surface gradient by which the vehicle CR is hardly moved), the vehicle holding control section 113 completely releases the holding of the brake hydraulic pressure before the drive torque of the vehicle CR starts increasing. In the case of an inclined road surface for which the absolute value of the road surface gradient is equal to or more than the predetermined value a, the holding of the brake hydraulic pressure is completely released after the drive torque starts increasing. Accordingly, the vehicle holding control section 113 determines the decompression gradient with reference to a decompression gradient map as shown in FIG. 5 based on the drive torque and road surface gradient.

The drive torque can be determined based on the amount of operation of the accelerator pedal AP acquired from the accelerator pedal stroke sensor 95. Alternatively, the vehicle holding control section 113 may acquire information of the drive torque determined by another control apparatus controlling the driving system of the vehicle CR.

Figure 5:
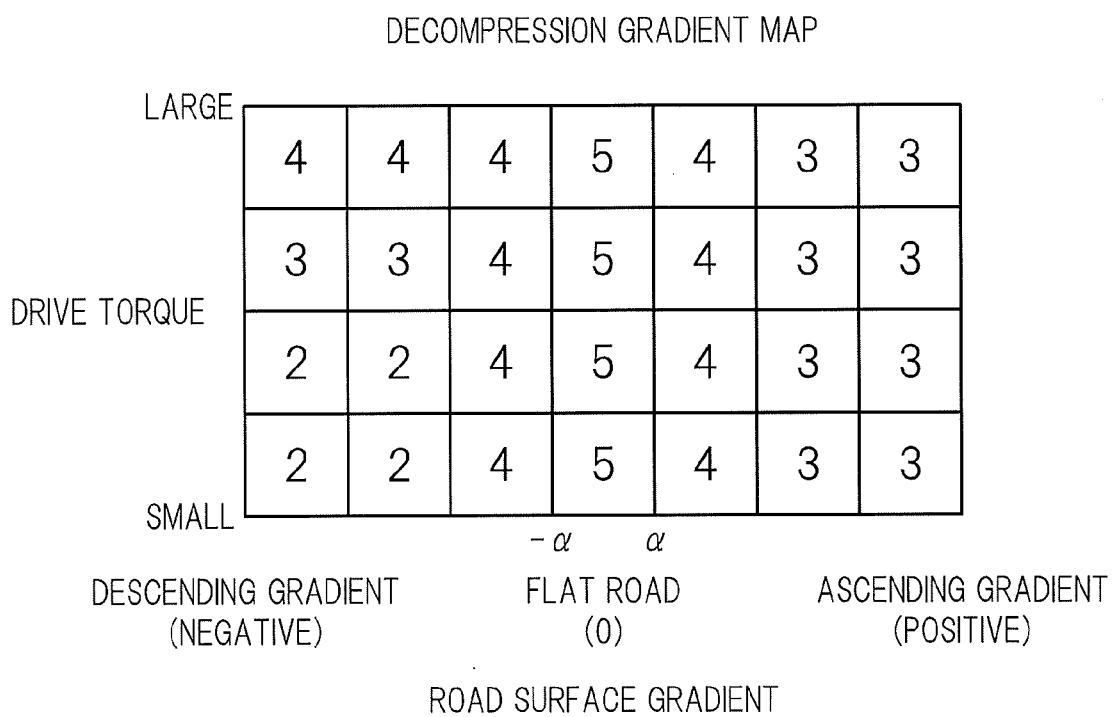
FIG. 5 is a decompression gradient map showing a decompression gradient having a road surface gradient and a drive torque as parameters.

In the decompression gradient map shown in FIG. 5, the decompression gradient is large regardless of the magnitude of the drive torque so that the holding of the brake hydraulic pressure can be completely released reliably before the drive torque of the vehicle CR starts increasing on a flat road (having a road surface gradient from $-\alpha$ to $\alpha$). This decompression gradient is a gradient by which decompression can be completed before the drive torque starts increasing even when the holding hydraulic pressure at a halt is high based on the time from when an accelerator operation is performed in advance in the vehicle CR to when the drive torque starts increasing. The decompression gradient is smaller on an inclined road surface than on a flat road. In a descending gradient, the larger the drive torque, the larger the decompression gradient. This immediately releases the holding of the brake hydraulic pressure when the drive torque is large, so as to meet the driver's intension to perform strong acceleration.

In the case of a descending gradient and a flat road, the vehicle holding control section 113 starts decompression as soon as it detects the depression of the accelerator pedal AP. In the case of an ascending slope, the vehicle holding control section 113 starts decompression to prevent the vehicle CR from sliding down when a small drive torque is generated.

[Effects]

Figure 6:
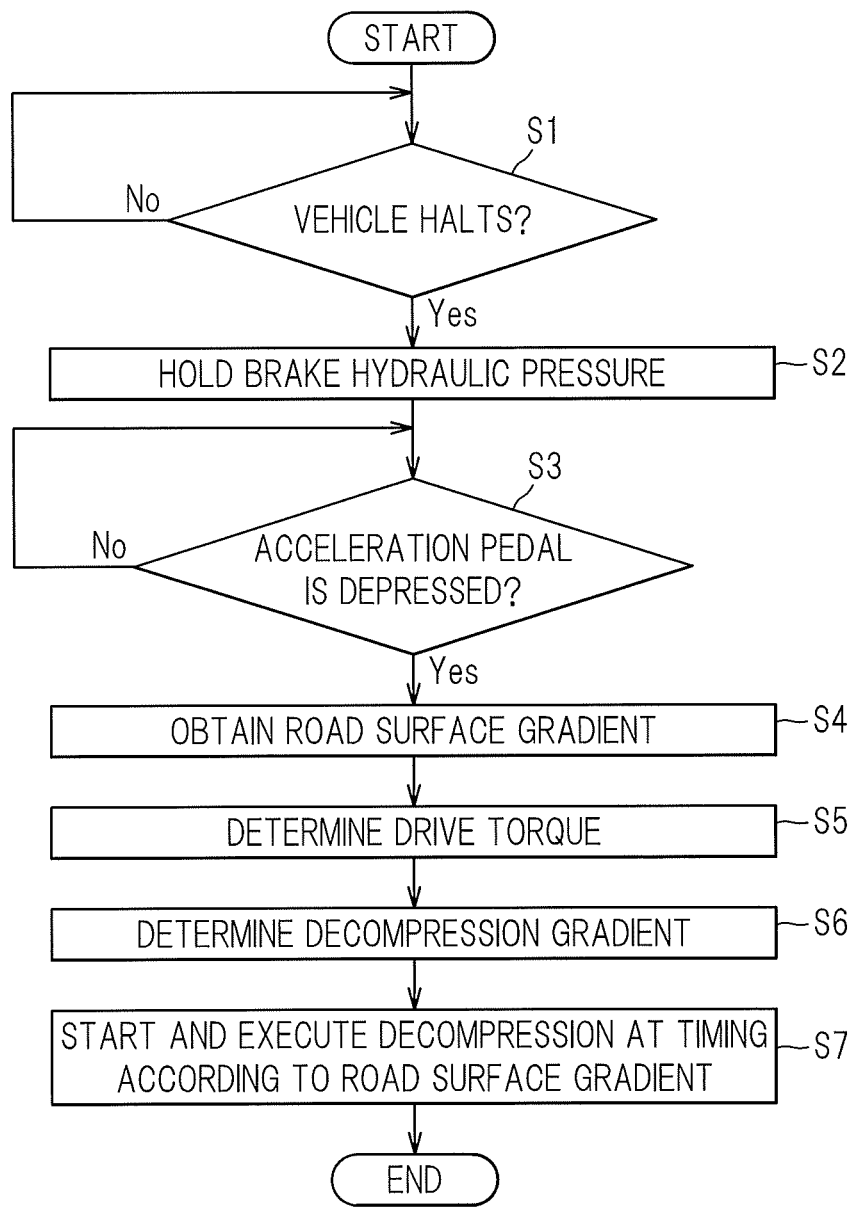
FIG. 6 is a flowchart showing the operation of the control apparatus.

The vehicle holding control in the above control apparatus 100 will be described with reference to FIG. 6.

The control apparatus 100 constantly acquires various parameters such as the wheel speed and front-rear acceleration from the sensors and the gradient acquiring section 112 constantly outputs the road surface gradient. The vehicle halt determination section 111 determines whether the vehicle CR is at a halt based on the wheel speed and, when determining that the vehicle CR is at a halt (Yes in S1), the vehicle holding control section 113 receives a signal indicating halt determination from vehicle halt determination section 111 and starts vehicle holding control. That is, the vehicle holding control section 113 stops the electric motor 42 and holds the brake hydraulic pressure (S2). Then, when the electric brake controller 110 detects the depression of the accelerator pedal AP as a condition for releasing vehicle holding control (Yes in S3), the vehicle holding control section 113 acquires the road surface gradient from the gradient acquiring section 112 (S4) and determines the value of the drive torque according to the amount of operation of the accelerator pedal AP (S5). Then, the vehicle holding control section 113 determines the decompression gradient with reference to the decompression gradient map in FIG. 5 based on the road surface gradient and the drive torque (S6).

Then, the vehicle holding control section 113 starts decompression at timing that depends on the road surface gradient and performs the decompression (S7). That is, in the case of a descending slope or flat road, the vehicle holding control section 113 starts decompression as soon as depression of the accelerator pedal AP starts. In the case of an ascending slope, the vehicle holding control section 113 starts decompression at timing when a small drive torque is generated. The decompression is performed at a certain gradient determined in step S6 in the embodiment.

Changes in the brake hydraulic pressure and other parameters by the above control will be described with reference to FIG. 7.

As shown in (a) of FIG. 7, if the accelerator pedal AP is depressed at time t1 when the vehicle CR is at a halt on a flat road and the brake hydraulic pressure is held, the brake hydraulic pressure starts reducing immediately. Since the decompression gradient of the brake hydraulic pressure at this time is an abrupt gradient indicated by a solid line, the decompression can be completed at time t2, which is before time t3 when the drive torque starts rising. Accordingly, when decompression is performed at a gentle decompression gradient as shown in a conventional example indicated by a dashed line, an increase in the drive torque and a reduction in the brake hydraulic pressure occur at the same time, so the difference (which is the real drive torque) between the drive torque and the brake hydraulic pressure suddenly changes and a sudden feeling may be caused during a start from a standstill. However, since the drive torque is used to start the vehicle CR as is in the present embodiment, a natural start from a standstill can be achieved.

The time difference between time t1 when the accelerator pedal AP is depressed and time t3 when the drive torque starts increasing arises from, for example, the play of the accelerator pedal AP, the time until the engine of an idle-stop vehicle restarts, and so on.

As shown in (b) of FIG. 7, in the case of an ascending slope, decompression starts at time t4, which is slightly after time t3 when the drive torque is generated, and the decompression is performed at a relatively-gentle decompression gradient, thereby enabling suppression of a dragging feeling at a start from a standstill while preventing the vehicle CR from sliding down.

In addition, as shown in (c) of FIG. 7, in the case of a descending slope, the releasing of the holding of brake hydraulic pressure starts at time t1 when the accelerator pedal AP is depressed and the decompression is performed at a gentle depression gradient to suppress a sudden start from a standstill.

As described above, in the control apparatus 100 according to the embodiment, since the brake hydraulic pressure is completely released before the drive torque of the vehicle CR starts increasing when the brake hydraulic pressure is released in vehicle holding control on a flat road, a natural start from a standstill can be achieved. Particularly in the embodiment, since the holding of the brake hydraulic pressure is completely released before the drive torque of the vehicle CR starts increasing only when the road surface gradient is substantially flat or the holding of the brake hydraulic pressure is completely released after the drive torque of the vehicle CR starts increasing on an inclined road surface, the sliding down of the vehicle CR can be suppressed on an inclined road. In addition, by completely releasing the brake hydraulic pressure before the drive torque of the vehicle CR starts increasing, a natural start from a standstill can be achieved substantially reliably even in a vehicle for which the rising timing of the drive torque cannot be determined easily.

In addition, by making the decompression gradient larger on a substantially flat road than on an inclined road surface, it is easy to complete decompression immediately by the time the drive torque rises.

[Modification]

Although an embodiment of the invention has been described above, the invention is not limited to the embodiment and various embodiments are allowed as described below.

For example, as the timing chart in FIG. 8 shows, the releasing of the brake hydraulic pressure in vehicle holding control may be completed as soon as the drive torque starts increasing (time t3). In this case, the decompression gradient is determined desirably based on the ratio of the holding hydraulic pressure to the time from when the releasing of the holding of the brake hydraulic pressure starts to when the drive torque starts increasing so that the releasing of the holding is completed as soon as the drive torque starts increasing. Such control can be performed based on the time acquired in advance by measuring the time until the drive torque starts increasing after execution of an accelerator operation in the vehicle. In a vehicle or the like that generates a torque necessary for a start from a standstill using an electric motor, the generation timing of the drive torque can be controlled finely, so such control can be achieved easily. Such a structure can achieve a natural start from a standstill while preventing the vehicle from sliding down substantially reliably.

In addition, although the decompression gradient is constant in the embodiment, the decompression gradient may be changed during decompression.

Although the actual brake hydraulic pressure is held and reduced by controlling the electric motor 42 in the above embodiment, the invention is not limited to the embodiment and the brake hydraulic pressure may be held by, for example, controlling the current passing through the inlet valve 52 or the pressure regulator 51 of the hydraulic pressure control unit U3 and the brake hydraulic pressure may be reduced by controlling the outlet valve 53.

The invention claimed is:

1. A vehicle brake hydraulic pressure control apparatus installed in a vehicle, the vehicle brake hydraulic pressure control apparatus comprising:
    a vehicle holding control section for performing vehicle holding control by holding a brake hydraulic pressure; and
    a gradient acquiring section for acquiring a road surface gradient,
    wherein the vehicle holding control section is configured to release the holding of the brake hydraulic pressure based on an accelerator operation of a driver, and
    wherein when an absolute value of the road surface gradient acquired by the gradient acquiring section is less than a predetermined value, the vehicle holding control section completes releasing of the holding of the brake hydraulic pressure before a drive torque of the vehicle starts increasing, and when the absolute value of the road surface gradient is equal to or more than the predetermined value, the vehicle holding control section completes releasing of the holding of the brake hydraulic pressure after the drive torque of the vehicle starts increasing.

2. The vehicle brake hydraulic pressure control apparatus according to claim 1,
    wherein a decompression gradient in the releasing of the holding of the brake hydraulic pressure in the vehicle holding control has a first state and a second state,
    the decompression gradient being in the first state when the absolute value of the road surface gradient is less than the predetermined value,
    the decompression gradient being in the second state when the absolute value of the road surface gradient is equal to or more than the predetermined value, and
    the first state of the decompression gradient is larger than the second state of the decompression gradient.

3. The vehicle brake hydraulic pressure control apparatus according to claim 1, wherein the drive torque of the vehicle is determined based on the accelerator operation.

4. The vehicle brake hydraulic pressure control apparatus according to claim 2, wherein if the vehicle holding control section determines that the vehicle is at a halt on an ascending slope based on the road surface gradient acquired by the gradient acquiring section, release of the holding of the brake hydraulic pressure is initiated after the drive torque of the vehicle starts increasing.

5. The vehicle brake hydraulic pressure control apparatus according to claim 1, wherein the drive torque of the vehicle is a drive torque of an engine.

6. The vehicle brake hydraulic pressure control apparatus according to claim 1, wherein the vehicle is a hybrid vehicle, and
    wherein the drive torque of the vehicle is a drive torque of an engine or a drive torque of a motor.

7. The vehicle brake hydraulic pressure control apparatus according to claim 1, wherein the vehicle is an electric vehicle, and
    wherein the drive torque of the vehicle is a drive torque of a motor.

8. The vehicle brake hydraulic pressure control apparatus according to claim 1, wherein the vehicle is a fuel cell vehicle, and
    wherein the drive torque of the vehicle is a drive torque of a motor.

9. A vehicle brake hydraulic pressure control apparatus installed in a vehicle including a drive source, the vehicle brake hydraulic pressure control apparatus comprising:
    a vehicle holding control section for performing vehicle holding control by holding a brake hydraulic pressure while the vehicle is at a standstill; and
    a gradient acquiring section for acquiring a road surface gradient,
    wherein the vehicle holding control section is configured to release the holding of the brake hydraulic pressure based on an accelerator operation of a driver, and
    wherein when an absolute value of the road surface gradient acquired by the gradient acquiring section is less than a predetermined value, the vehicle holding control section completes releasing of the holding of the brake hydraulic pressure before a drive torque of the drive source starts increasing, and when the absolute value of the road surface gradient is equal to or more than the predetermined value, the vehicle holding control section completes releasing of the holding of the brake hydraulic pressure after the drive torque of the drive source starts increasing.

10. The vehicle brake hydraulic pressure control apparatus according to claim 9,
wherein a decompression gradient in the releasing of the holding of the brake hydraulic pressure in the vehicle holding control has a first state and a second state,
the decompression gradient being in the first state when the absolute value of the road surface gradient is less than the predetermined value,
the decompression gradient being in the second state when the absolute value of the road surface gradient is equal to or more than the predetermined value, and
the first state of the decompression gradient is larger than the second state of the decompression gradient.

11. The vehicle brake hydraulic pressure control apparatus according to claim 9, wherein the drive torque of the drive source is determined based on the accelerator operation.

12. The vehicle brake hydraulic pressure control apparatus according to claim 10, wherein if the vehicle holding control section determines that the vehicle is at a standstill on an ascending slope based on the road surface gradient acquired by the gradient acquiring section, release of the holding of the brake hydraulic pressure is initiated after the drive torque of the drive source starts increasing.

13. The vehicle brake hydraulic pressure control apparatus according to claim 9, wherein the drive torque of the drive source is a drive torque of an engine.

14. The vehicle brake hydraulic pressure control apparatus according to claim 9, wherein the vehicle is a hybrid vehicle, and
wherein the drive torque of the drive source is a drive torque of an engine or a drive torque of a motor.

15. The vehicle brake hydraulic pressure control apparatus according to claim 9, wherein the vehicle is an electric vehicle, and
wherein the drive torque of the drive source is a drive torque of a motor.

16. The vehicle brake hydraulic pressure control apparatus according to claim 9, wherein the vehicle is a fuel cell vehicle, and
wherein the drive torque of the drive source is a drive torque of a motor.

* * * * *